3,082,051
FIBER FORMING PROCESS
Eugene Wainer, Cleveland Heights, and Robert M. Beasley, Shaker Heights, Ohio, assignors to Horizons Incorporated, a corporation of New Jersey
Filed July 24, 1959, Ser. No. 829,220
12 Claims. (Cl. 18—48)

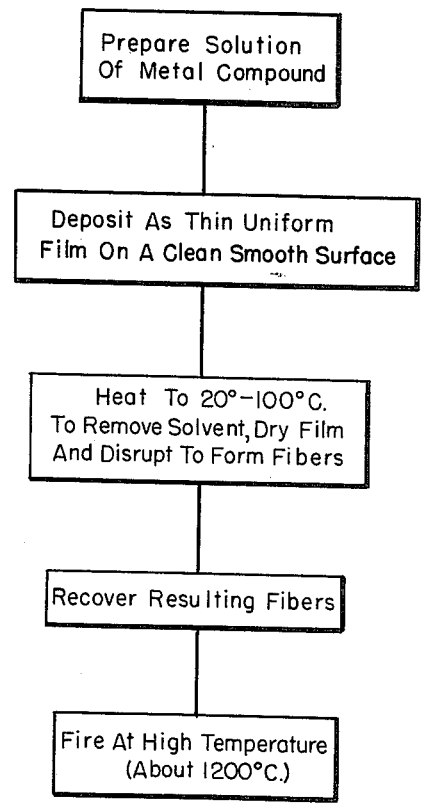

This invention relates to a process for preparing ceramic fiber from solutions of soluble salts of metals and to the products so obtained.

More particularly it relates to processes wherein solvent is removed from solutions of suitable salts by the application of heat to thin films of such solutions to yield a product which is in the form of a fiber or filament or thin strip of inorganic compound, which is preferably the oxide.

In the usual crystallization of a salt from solution as a result of evaporation, normally only the pure compound itself can be obtained from the solution by crystallization as solvent is removed. In the usual instance, no matter how high the temperature which has been applied in the evaporation step, salt is not further decomposed except possibly for the loss of water of hydration. This is true even in such drastic processes as spray drying.

Other salts however are found to be extremely sensitive to the removal of solvent at elevated temperatures and it is this type only which has been found amenable to the process about to be described.

A single FIGURE in the nature of a flow sheet illustrates schematically the several steps of the process of this invention.

For purposes of illustration the invention will first be described as it applies to zirconium acetate, given as an example of a salt which in the process decomposes to a refractory metal oxide, the base ingredient of the resulting ceramic fiber. As will be evident, the process is applicable to other metal salts of organic acids including both carboxylic acids and thio analogs thereof, and is not intended to be construed as limited to zirconium acetate.

Example 1

An aqueous solution containing 1.5% $ZrO_2$ by weight was prepared by dissolving 7.5 grams of hydrated zirconium carbonate in dilute acetic acid. Hydrochloric acid was added to the solution to bring the pH to about 4. Other acids, particularly acetic acid, may be used in place of the HCl. The resulting acidified solution was spread on a clean smooth flat Pyrex glass surface as a thin uniform film consisting of about 55 cc. of solution per square foot of glass surface covered. Merely pouring the liquid on the glass was sufficient to achieve the desired spreading. The resulting film may be dried at any suitable temperature between room temperature (20° C.) and 100° C. and is preferably dried at about 80° C. by means of infrared lamps positioned above the film. The removal of solvent proceeds quietly and without noticeable effect until all of the liquid has been removed at which point the clear film has turned opaque and been converted to fibers. Instead of evaporating single plates, filmed plates may be stacked and evaporated, thereby increasing capacity. For example about 1½ hours are required to evaporate a stack of one square foot of plates ten plates high.

The resulting fibers were collected and placed on a suitable support for firing in a furnace at about 1200° C. to insure complete elimination of water and acid, consolidate the structure, and increase strength. In some cases, chemically combined water is so tenaciously held that temperatures in excess of red heat are required for water removal and fiber consolidation. The 1200° C. temperature is sufficient to insure complete removal of water and acid and may be lowered when circumstances permit.

Fibers made entirely from a soluble salt source will have a greater tendency to crystal growth on firing than those made from part sol and part soluble salt. Other sources or types of salts can be used alone or in combination. Zirconyl carbonate or zirconyl oxychloride both have been used with success, particularly in combination with zirconyl acetate. It is preferred to use no more than two percent of such additives with zirconyl acetate.

The following is offered as one possible explantion of the above procedure. When a solution of zirconium acetate is evaporated under reduced pressure conditions so that the temperature does not rise much above room temperature, no fibers will be obtained. A microcrystalline product in powdered form represents the final result. When the same solution is spread on glass and the evaporation is carried out through the use of elevated temperatures, then fibers are obtained. The reason for the difference is the following: In raising the temperature of zirconium acetate, hydrolysis takes place and a hydrated derivative of zirconium acetate is produced which is an actual chemical combination. The feature of this hydrated derivative is that it is soluble or dispersible in the residual liquid which is now higher in acetic acid than it was originally. This hydrated derivative may or may not be in colloidal form. As the evaporation continues, the degree of hydration also extends until the system approaches a colloidal dispersion of a hydrated compound in a soluble base which in this case is acetic acid. The continued formation of a colloidal system in the presence of a high acid concentration which contains some zirconium salt in solution provides a protective colloid type of system, and because of its nature, crystallization in the ordinary sense is practically impossible. As the elimination of acid and water continues, the end product consists entirely of a colloid whose particle size is so fine and whose separation from its neighbors is so complete that the usual parameters of crystal growth are inhibited totally.

Referring now only to water solutions, organic salts of metals in which the acid used contains hydroxyl radicals (carboxylic type) will produce this manifestation. Carboxyl type organic acids suitable for the purposes of this invention are those exhibiting dissociation constants to produce hydrogen ions of at least $1.5 \times 10^{-5}$. In general, acids taken from the following group are found to be effective: acetic, formic, oxalic, citric, tartaric, maleic, lactic, adipic, itaconic, their halogenated derivatives and the like.

A suitable method for preparing the water solutions is to dissolve the freshly precipitated hydroxides or carbonates of the metal in question by adding them with stirring to a water solution containing an excess of one of the above organic acids.

Organic solvents with or without the addition of minor amounts of water may be used. These usually require a different class of metallo-organic compounds. An advantage of organic solvents is that evaporation is more rapid and fiber formation may take place at a lower temperature. Furthermore, higher concentrations of equivalent metal oxide can be used. Examples of such metal salts are the acetyl acetonates (2,4 pentanedione derivatives) and the alcoholates. These compounds are readily produced by well known techniques. A disadvantage is the relatively high cost of the reagents compared to the all aqueous systems.

*Example 2*

As an example of the practice of this invention using organic solvents, 353 grams of ferric acetyl acetonate is dissolved in 750 cc. of methyl alcohol. Two hundred and forty (240) grams (25% excess over theoretical) of glacial acetic acid at a temperature of 30° C. are added slowly with stirring. With continued stirring, 50 cc. of water are added. The solution is then dried in the film form as before, and extensive fiber formation takes place at temperatures of the order of 45 to 55° C. As before, final baking is completed at 100 to 120° C., and the fibers are again consolidated by firing at 1200° C.

*Example 3*

Alcoholates may be used. A solution of 273 grams of zirconium tetraethylate is dissolved in 500 cc. of anhydrous alcohol. One hundred and fifty (150) grams (30 grams excess) of glacial acetic acid at a temperature of 30° C. are added slowly with stirring. Fiber formation is accomplished as before at a temperature between 50 and 60° C. It is important that the fiber formation takes place with free access of air. The moisture of the air is slowly absorbed by the drying film in sufficient quantities to form a zirconium hydrate sol in the evaporating acid solution.

The foregoing have emphasized the use of acid conditions in the mother solution. Basic conditions may also be used to advantage. A number of metals form carbonates which are soluble in ammonium carbonate solutions. Such metals include some of the rare earths, zirconium, hafnium, thorium, molybdenum, tungsten, iron, cobalt, nickel and the like. In these cases the freshly precipitated carbonates are dissolved in a 50% water solution of $(NH_4)_2CO_3$. These may be evaporated directly to produce fibers, in which case the fibers tend to be somewhat coarse and short. The fiber length may be increased and the fiber width and thickness may be decreased by adding the ammonium salts of the organic acids listed previously. Generally one mole or more of such ammonium salts may be added per mole of oxide.

Metals whose compounds may be used to produce fibers in accordance with this invention are found throughout the periodic table with the exception of the strong alkalies and alkaline earths; however, fiber formation is most readily accomplished with the less basic oxides which tend to hydrolyze readily or form coordination complexes containing hydroxyl groups readily. Such metals are aluminum, the rare earths, zirconium, hafnium, thorium, niobium, tantalum, chromium, manganese, iron, cobalt and nickel.

Combinations of these metals with others not in the list may be accomplished by using mixtures of these fiber producing salts and colloidal dispersions of oxides such as silica, for example, as described in an earlier specification. Obviously combinations of these fiber forming salts may be used to produce complex chemical structures.

As indicated above, the tendency of an organic salt of a metal to form fibers is due to the formation of a colloidal dispersion or sol of a hydrated or similar derivative of the metal oxide or compound as result of hydration or excessive coordination, said sol being stable in colloidal form in the remaining liquid media. It is normally difficult to form fibers with highly basic oxides such as those of zinc, beryllium, cadmium, or copper. Highly acid oxides such as those of niobium or tantalum are amenable to the procedure through use of basic mother liquors. For those metal salts which are in the very slightly basic, neutral, or slightly acid category fiber formation is accomplished as described, but the more basic the oxide the more difficult the technique and the poorer the fiber quality.

Salts of zinc are a case in point. Used alone very poor fiber formation is encountered. In some cases it is desired to form zinc spinels with oxides of Fe, Co, Ni and Mn. Addition of these latter fiber forming salts improves the fiber forming characteristics of the mixture containing zinc, but still not to the extent where the excellent formability of a pure iron salt, for example, is reached.

In such cases improved fiber formation is achieved through the addition of a surprisingly small quantity of a protective colloid. When such protective colloid is used with ordinarily good fiber producers, the process is still further improved in the direction of increasing length and reducing cross-section. The amount of protective colloid which is effective will vary between 0.005% and 0.2% dry basis on the respective oxide in question, with the optimum being in the range of 0.02% to 0.05%. Amounts much above 0.2% tend to produce plates rather than fibers. Suitable protective colloids include: gelatin, glue, casein, gum tragacanth, gum arabic, methyl cellulose and the like. They are generally added as dilute water solutions in concentrations of 2 to 3%.

Having now described the invention in accordance with the patent statutes, we claim:

1. A process for preparing fibers which comprises: preparing a solution of an organic salt of a metal selected from the group consisting of aluminum, the rare earths, zirconium, hafnium, thorium, niobium, tantalum, chromium, manganese, iron, cobalt and nickel and mixtures of said metals with one another and with an organic metal salt of a metal selected from the group consisting of zinc, beryllium, copper and cadmium, the resulting solution being one which forms a colloidal dispersion stable in the remaining liquid present upon exposing the solution to heat sufficient to remove liquid from the originally depositing thin film of same; depositing a thin film of the solution on a clean glass-smooth solid surface; drying the resultant film by heating to a relatively low temperature between 20° C. and 100° C., maintaining the film at said temperature until the solvent has been removed and the film has been disrupted to form fibers.

2. The process of claim 1 wherein the fibers are recovered and the said fibers are then fired at a temperature in excess of about 1000° C.

3. The process of claim 1 wherein the solution to be deposited as a thin film is acidic.

4. The process of claim 1 wherein the solution to be deposited as a thin film is alkaline.

5. The process of claim 1 wherein a protective colloid is added to the solution to be deposited as a thin film.

6. Ceramic fibers prepared by the process of claim 1.

7. Ceramic fibers prepared by the process of claim 2.

8. A process for the preparation of zirconia fibers which comprises: preparing a solution of an organic zirconium salt; depositing a thin film of said solution on a clean glass-smooth solid surface; exposing the film to a temperature of between about 50° C. and 80° C.; maintaining the film at said temperature for a time sufficient for the solvent to be removed, at which time the film turns opaque and disintegrates into fibers, and recovering the zirconia fibers from the solid surface.

9. The process of claim 8 including in addition, the step of heating the recovered fibers to a temperature of about 1200° C. to insure complete elimination of residual water and acid from the recovered fibers.

10. The process of claim 8 wherein the solution of the organic zirconium compound is in an aqueous solvent.

11. The process of claim 8 wherein the solution of the organic zirconium compound is in a non-aqueous organic solvent.

12. The process of claim 1 wherein the organic salt is selected from the group consisting of salts of carboxylic acids having a dissociation constant of at least $1.5 \times 10^{-5}$, to produce the first hydrogen ion.

References Cited in the file of this patent

UNITED STATES PATENTS

| | | |
|---|---|---|
| 2,013,857 | Kinzie | Sept. 10, 1935 |
| 2,185,789 | Jacque | Jan. 2, 1940 |
| 2,317,131 | Conaway | Apr. 20, 1943 |
| 2,338,463 | Skaupy et al. | Jan. 4, 1944 |
| 2,425,626 | Light | Aug. 12, 1947 |
| 2,467,089 | Marisic | Apr. 12, 1949 |
| 2,517,694 | Merion et al. | Aug. 8, 1950 |
| 2,695,835 | Hare | Nov. 30, 1954 |
| 2,715,763 | Marley | Aug. 23, 1955 |
| 2,833,620 | Gier et al. | May 6, 1958 |
| 2,886,404 | Teja | May 12, 1959 |
| 2,908,545 | Teja | Oct. 13, 1959 |
| 2,915,475 | Bugosh | Dec. 1, 1959 |

FOREIGN PATENTS

| | | |
|---|---|---|
| 512,292 | Great Britain | Oct. 13, 1959 |